US006967943B1

(12) United States Patent
Hämäläinen et al.

(10) Patent No.: US 6,967,943 B1
(45) Date of Patent: Nov. 22, 2005

(54) TIME DIVISION MULTIPLE ACCESS RADIO SYSTEMS

(75) Inventors: Jari Hämäläinen, Kangajala (FI); Petri Järvinen, Tampere (FI); Jarno Knuutila, Tampere (FI); Arto Leppisaari, Tampere (FI); Kari Malmivirta, Tampere (FI); Jarkko Oksala, Tampere (FI); Ari Salminen, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/098,832

(22) Filed: Jun. 17, 1998

(30) Foreign Application Priority Data

Jun. 24, 1997 (FI) .................................... 972724

(51) Int. Cl.[7] .......................... H04L 12/66; H04Q 7/00; H04Q 7/20; H04J 3/00
(52) U.S. Cl. ....................... 370/347; 370/280; 370/329; 370/352; 455/466
(58) Field of Search ............................... 370/280–352, 370/201, 225, 503, 468, 249, 250, 420, 422, 370/466; 395/200.74, 857; 455/450–466, 455/423–448

(56) References Cited

U.S. PATENT DOCUMENTS

| | | | | |
|---|---|---|---|---|
| 5,124,985 A | * | 6/1992 | Hoshikawa .................. 370/347 |
| 5,241,542 A | | 8/1993 | Natarajan et al. ........... 370/95.3 |
| 5,257,257 A | | 10/1993 | Chen et al. .................... 370/18 |
| 5,420,851 A | * | 5/1995 | Seshadri et al. ............. 370/280 |
| 5,442,635 A | * | 8/1995 | Persson ....................... 370/347 |
| 5,521,904 A | * | 5/1996 | Eriksson et al. ............. 370/249 |
| 5,539,730 A | * | 7/1996 | Dent ........................... 370/280 |
| 5,594,720 A | * | 1/1997 | Papadopoulos et al. ..... 370/330 |
| 5,594,738 A | * | 1/1997 | Crisler et al. ............... 370/347 |
| 5,602,836 A | * | 2/1997 | Papadopoulos et al. ..... 370/280 |
| 5,640,395 A | * | 6/1997 | Hamalainen et al. ........ 370/322 |
| 5,729,534 A | * | 3/1998 | Jokinen et al. .............. 370/280 |
| 5,729,541 A | * | 3/1998 | Hamalainen et al. ........ 370/337 |
| 5,748,624 A | * | 5/1998 | Kondo ......................... 370/347 |
| 5,754,537 A | * | 5/1998 | Jamal .......................... 370/330 |
| 5,757,787 A | * | 5/1998 | Dent ........................... 370/330 |
| 5,761,197 A | * | 6/1998 | Takefman .................... 370/337 |
| 5,768,254 A | * | 6/1998 | Papadopoulos et al. ..... 370/201 |
| 5,805,633 A | * | 9/1998 | Uddenfeldt .................. 375/202 |
| 5,809,015 A | * | 9/1998 | Elliott et al. ................ 370/250 |
| 5,812,539 A | * | 9/1998 | Dent ........................... 370/321 |
| 5,878,277 A | * | 3/1999 | Ohta ........................... 395/857 |

(Continued)

FOREIGN PATENT DOCUMENTS

EP 0 644 702 A1 3/1995

(Continued)

OTHER PUBLICATIONS

GSM Phase 2+ "High Speed Circuit Switched Data" (HSCSD—specified in *GSM 02.34* and *GSM 03.34*).

(Continued)

*Primary Examiner*—Man U. Phan
(74) *Attorney, Agent, or Firm*—Perman & Green, LLP.

(57) ABSTRACT

A method of operating a time division multiple access (TDMA) radio system having multi-slot capabilities and utilizing half-duplex transmission/reception where uplink and downlink user data transmissions between a mobile station (MS) 2 and a base station (BS) 3 are made in separate TDMA frames. A greater number of time slots are allocated to the mobile station 2 in each downlink TDMA frame than in each uplink TDMA frame to improve the efficiency of radio resource allocation and of the radio module 4 of the mobile station 2.

10 Claims, 1 Drawing Sheet

U.S. PATENT DOCUMENTS

Figure 1:
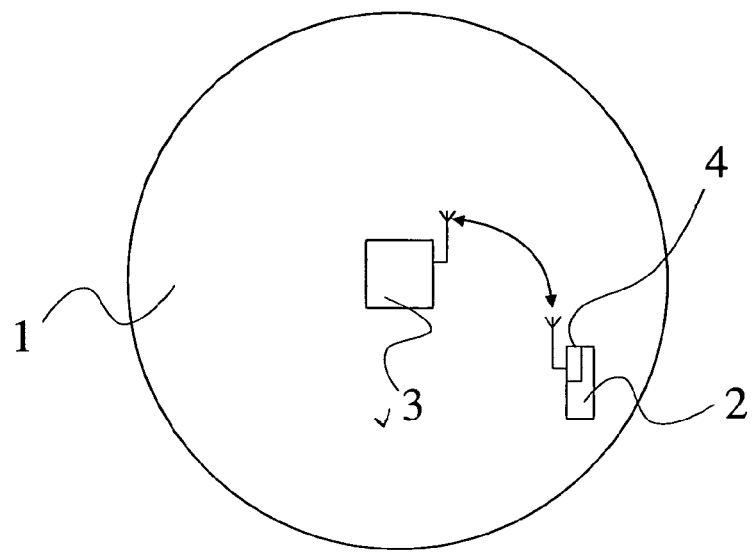

| | | | | |
|---|---|---|---|---|
| 5,940,380 | A * | 8/1999 | Poon et al. | 370/330 |
| 5,956,642 | A * | 9/1999 | Larsson et al. | 455/449 |
| 6,016,311 | A * | 1/2000 | Gilbert et al. | 370/280 |
| 6,205,157 | B1 * | 3/2001 | Galyas et al. | 370/503 |
| 6,240,076 | B1 * | 5/2001 | Kanerva et al. | 370/330 |
| 6,266,330 | B1 * | 7/2001 | Jokinen et al. | 370/329 |
| 6,334,057 | B1 * | 12/2001 | Malmgren et al. | 455/450 |
| 6,614,777 | B2 * | 9/2003 | Menzel et al. | 370/347 |
| 6,744,778 | B1 * | 6/2004 | Allpress et al. | 370/442 |
| 6,747,966 | B1 * | 6/2004 | Ahmavaara | 370/337 |
| 6,804,211 | B1 * | 10/2004 | Klein et al. | 370/329 |
| 6,813,254 | B1 * | 11/2004 | Mujtaba | 370/335 |
| 6,819,661 | B2 * | 11/2004 | Okajima et al. | 370/347 |

FOREIGN PATENT DOCUMENTS

| | | |
|---|---|---|
| EP | 0 720 405 A2 | 7/1996 |
| EP | 0 740 431 A1 | 10/1996 |
| EP | 0 758 822 A1 | 2/1997 |
| WO | WO 95/33350 | 12/1995 |

OTHER PUBLICATIONS

GSM Phase 2+, General Packet Radio Service (GPRS), "Requirement Specification Of General Packet Radio Service", GSM 01.60, version 1.1.0, Nov. 1994.
GSM 02.60, version 5.2.0.
GSM 03.60, version 5.2.0.
GSM 03.64, version 5.2.0.

* cited by examiner

TIME DIVISION MULTIPLE ACCESS RADIO SYSTEMS

FIELD OF THE INVENTION

The present invention relates to time division multiple access radio systems and more particularly to time division multiple access radio systems which have multi-slot capabilities.

BACKGROUND OF THE INVENTION

Many existing digital wireless or mobile telephone networks make use of time division multiple access (TDMA) to share out radio resources between a number of mobile stations and between a number of channels. For example, in the European Telecommunications Standards Institute (ETSI) GSM standard, a given frequency band is divided in the time domain into a succession of frames, known as TDMA (Time Division Multiplexed Access) frames. The length of a TDMA frame is 4.615 ms. Each TDMA frame is in turn divided into eight consecutive slots of equal duration. In the conventional circuit switched transmission mode, when a call is initiated, a full rate bidirectional traffic channel (TCH/F) is defined for that call by reserving two time slots (1 to 8), in each of a succession of TDMA frames, for the duration of the call. One of these slots provides the downlink from the base station (BS) to the mobile station MS) whilst the other provides the uplink.

The circuit switched transmission mode in GSM provides for a data transmission rate of 9.6 kbps. However, due to the demand for higher transmission rates, a set of GSM enhancements known as GSM Phase 2+ have been specified by ETSI. One of the main features of GSM Phase 2+ is known as High Speed Circuit Switched Data (HSCSD—specified in GSM 02.34 and GSM 03.34) which achieves an increased data transmission rate by using more than one TCH/F for a single connection (i.e. effectively reserving two or more consecutive time slots in each TDMA frame).

GSM Phase 2+ also specifies (see for example GSM 01.60, 02.60, 03.60, and 03.64) a new feature known as General Packet Radio Service (GPRS). GPRS provides for the dynamic allocation of radio resources, with the allocation for uplink and downlink communications being made separately and independently of each other. That is to say that a time slot is allocated to a particular MS to BSS link only when there is data to be transmitted. The unnecessary reservation of a TCH/F, when there is no data to be transmitted, is thus avoided. In addition, a high speed packet switched transmission channel may be provided by assigning two or more slots in each of a succession of TDMA frames to a single MS.

In the current GSM standard, because only a single time slot in each TDMA frame can be reserved for the uplink channel, and similarly for the downlink channel, it is easy to keep the two reserved slots separated in time so that a single radio module can be used, in the MS, for both transmission and reception. This module can also be used for monitoring the radio conditions in the serving cell and in neighbouring cells. However, with the introduction of HSCSD and GPRS where the number of reserved slots in a TDMA frame is variable, if slots are reserved for both uplink and downlink transmission in the same TDMA frame then there exists the possibility that uplink and downlink slots will overlap in time. Communication is then 'full-duplex' and it is necessary to provide separate radio modules for transmission, reception, and monitoring, i.e. a total of three radio modules. The preferred option is therefore to use only 'half-duplex' communication where uplink and downlink transmissions are made in alternate TDMA frames. The possibility for uplink and downlink transmissions to overlap is therefore eliminated as is the need for separate radio modules in the MS. Current proposals are for symmetric uplink and downlink resource allocation where the same number of time slots in alternate frames are reserved for both uplink and downlink transmissions.

SUMMARY OF THE INVENTION

According to a first aspect of the present invention there is provided a method of operating a time division multiple access (TDMA) radio system having multi-slot capabilities and utilising half-duplex transmission/reception where uplink and downlink user data transmissions between a mobile station (MS) and a base station (BS) are made in separate TDMA frames, the method comprising allocating a greater number of time slots in each downlink TDMA frame than in each uplink TDMA frame, to said mobile station.

This asymmetric allocation of resources is possible because the amount of data transferred over the downlink is, in general, considerably greater than that transferred over the uplink. For example, where the MS is used to access the Internet. The present invention gives rise to a number of significant advantages over the previously proposed symmetric allocation. Firstly, because the MS is transmitting over fewer time slots, the implementation of the power amplifier of the radio module is made simpler. Power losses are reduced as, consequently, are heat sink requirements. Secondly, power consumption is reduced increasing the stand-by and active operating times of the MS and making the selection of appropriate batteries easier. Thirdly, the price of the mobile station is reduced.

Preferably, the uplink and downlink TDMA frames are provided by alternate TDMA frames of a selected frequency band. The TDMA radio system may utilise GPRS or HSCSD protocols. However, other suitable protocols may also be used.

Embodiments of the invention may make use of four time slots for the downlink and two time slots for the uplink. However, any other suitable combination may be used.

According to a second aspect of the present invention there is provided a time division multiple access (TDMA) radio system having multi-slot capabilities and utilising half-duplex transmission/reception where uplink and downlink user data transmissions between a mobile station (MS) and a base station (BS) are made in separate TDMA frames, the system comprising control means capable of allocating a greater number of time slots in each downlink TDMA frame than in each uplink TDMA frame, to said mobile station.

According to a third aspect of the present invention there is provided a mobile communication device arranged to operate in a time division multiple access (TDMA) radio system having multi-slot capabilities, the mobile communication device comprising a radio module utilising half-duplex transmission/reception where uplink and downlink user data transmissions between the mobile communication device and a base station (BS) are made in separate TDMA frames, wherein a greater number of time slots may be allocated in each downlink TDMA frame than in each uplink TDMA frame, to the mobile communication device.

BRIEF DESCRIPTION OF THE INVENTION

Figure 2:
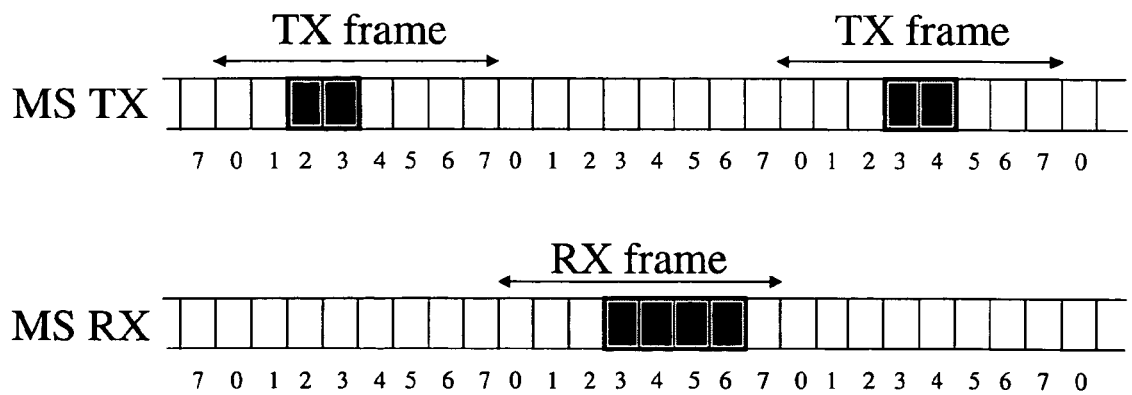

For a better understanding of the present invention and in order to show how the same may be carried into effect reference will now be made, by way of example, to the accompanying drawings, in which:

FIG. 1 shows schematically a GSM mobile telephone network and a mobile station in communication with the network; and FIG. 2 shows schematically uplink and downlink transmissions between a base station of the GSM network and the mobile station.

DETAILED DESCRIPTION

There is illustrated in FIG. 1 a cell 1 of a cellular mobile telephone network. A mobile station (or telephone) 2 located within the cell 1 communicates with a base station (BS) 3 of the cell. As has already been described above, when a call or data connection is made from the mobile station 2 to the BS 3 or vice versa, a downlink 'channel' and an uplink 'channel' are reserved to enable bi-directional communication to take place. Both of these channels are in the same frequency band and each consists of a plurality of time slots reserved in every other TDMA frame.

This is illustrated in FIG. 2 where the upper diagram illustrates the time slots (2 and 3) reserved for the uplink channel, i.e. for user data transmission from the MS 2 to the BSS 3, MS TX, and the lower diagram illustrates the time slots (3 to 6) reserved for the downlink channel, i.e. for user data reception by the MS 2, MS RX. The TDMA frames (TX and RX frames) of the uplink and downlink channels are interlaced so that the frames alternate between uplink and downlink channels. In this way, regardless of the number or location of slots reserved for either the uplink or downlink channels, the reserved slots will not overlap in time. The MS 2 can therefore be provided with a single radio module 4 which performs both transmission and reception functions.

Furthermore, the number of time slots reserved in any one TDMA frame for the downlink channel is generally greater than the number of channels reserved for the uplink channel (although the system may also be capable of operating in a symmetric allocation mode where the number of slots allocated for reception and transmission are the same). This represents a new multi-slot class for TDMA radio systems. In the example shown in FIG. 2, two time slots are allocated to the MS 2 in each of the uplink TDMA frames and four time slots are allocated in each of the downlink frames. As already explained above, higher data transmission rates are generally required for the downlink than are required for the uplink. The asymmetry of time slot allocation tends to increase the efficiency of radio resource allocation and also results in power saving and other efficiencies in the MS 2.

It will be appreciated by the person of skill in the art that modifications may be made to the above described embodiment without departing from the scope of the present invention. In one modification, the uplink and downlink TDMA frames need not be contiguous. For example, one frame in four may be allocated to the uplink and one frame in four (or one frame in two) allocated to the downlink, provided that the uplink and downlink frames do not overlap.

Whilst the invention relates to the transmission and reception of user data, it is noted that transmission and reception of signalling data may take place in the same TDMA frame and in the same TDMA frame as either transmission or reception of user data.

What is claimed is:

1. A method of operating a time division multiple access (TDMA) radio system having multi-slot capabilities and utilising half-duplex transmission/reception where uplink and downlink user data transmissions between a mobile station and a base station are made in TDMA frames, wherein TDMA frames for uplink user data transmissions are separate from TDMA frames for downlink user data transmissions, the method comprising allocating a greater number of time slots in each downlink TDMA frame than in each uplink TDMA frame, to said mobile station.

2. A method according to claim 1, wherein the TDMA frames alternate between reception and transmission frames.

3. A method according to claim 1, wherein the TDMA radio system utilises the GPRS protocol.

4. A method according to claim 1, wherein the TDMA radio system utilises the HSCSD protocol.

5. A time division multiple access (TDMA) radio system having multi-slot capabilities and utilising half-duplex transmission/reception where uplink and downlink user data transmissions between a mobile station and a base station are made in TDMA frames, wherein TDMA frames for uplink user data transmissions are separate from TDMA frames for downlink user data transmissions, the system comprising control means for allocating a greater number of time slots in each downlink TDMA frame than in each uplink TDMA frame, to said mobile station.

6. A mobile communication device arranged to operate in a time division multiple access (TDMA) radio system having multi-slot capabilities, the mobile communication device comprising a radio module utilising half-duplex transmission/reception where uplink and downlink user data transmissions between the mobile communication device and a base station are made in TDMA frames, wherein TDMA frames for uplink user data transmissions are separate from TDMA frames for downlink user data transmissions, wherein a greater number of time slots may be allocated in each downlink TDMA frame than in each uplink TDMA frame, to the mobile communication device.

7. A mobile communication device according to claim 6, wherein the TDMA frames alternate between reception and transmission frames.

8. A mobile communication device according to claim 6, wherein the TDMA radio system utilises the GPRS protocol.

9. A mobile communication device according to claim 6, wherein the TDMA radio system utilises the HSCSD protocol.

10. The method of claim 1 wherein the uplink TDMA frames and the downlink TDMA frames are not contiguous.

* * * * *